UNITED STATES PATENT OFFICE.

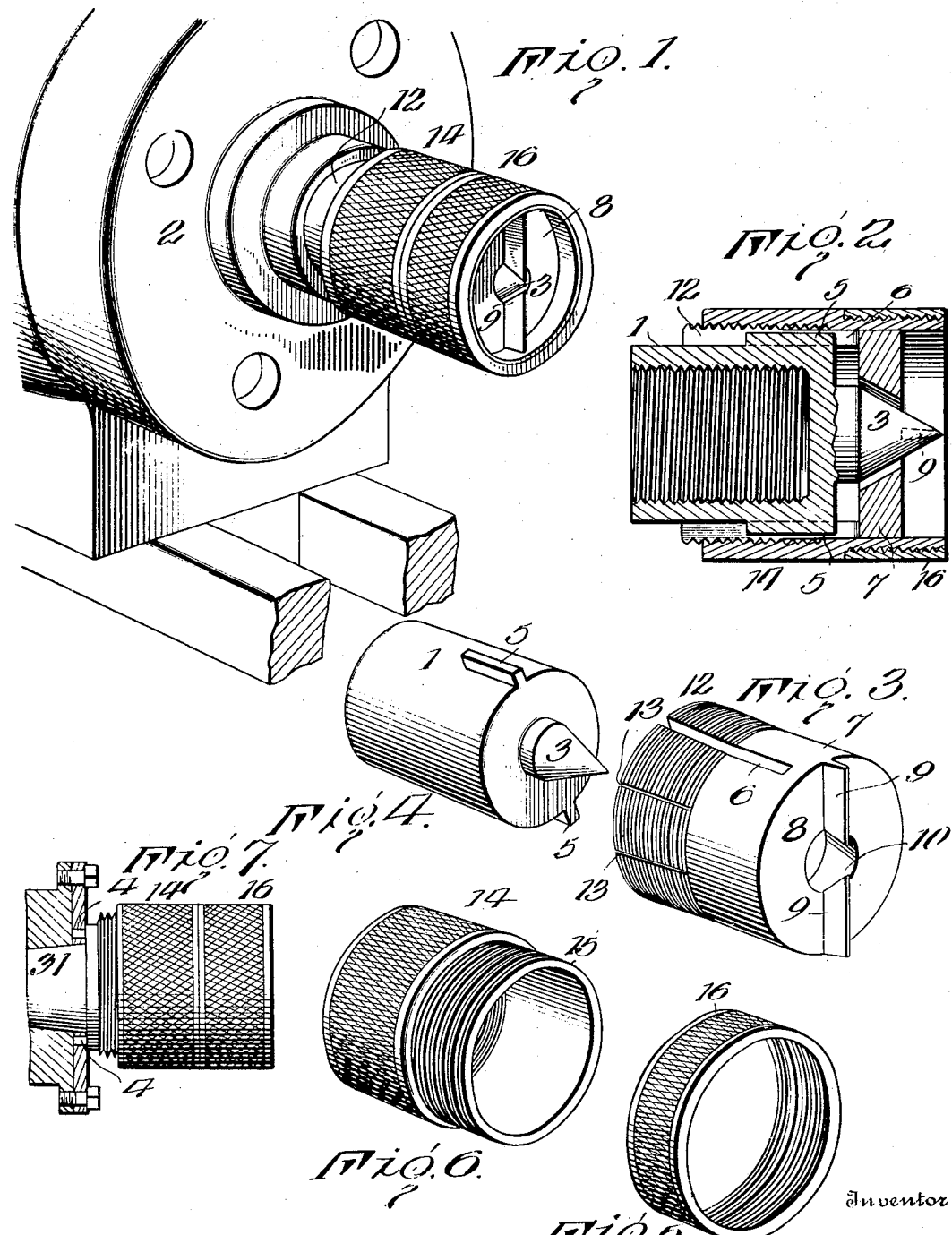

PETER ARCHER, OF WASHINGTON, DISTRICT OF COLUMBIA.

ATTACHMENT FOR LATHES.

1,246,697.  Specification of Letters Patent.  Patented Nov. 13, 1917.

Application filed December 14, 1916. Serial No. 136,890.

*To all whom it may concern:*

Be it known that I, PETER ARCHER, of Washington, in the District of Columbia, have invented certain new and useful Improvements in Attachments for Lathes; and I do hereby declare the following to be a full, clear, and exact description of the invention, such as will enable others skilled in the art to which it appertains to make and use the same.

This invention relates to lathe dogs, and the primary object of the invention is to provide improved, simple and efficient means for centering and driving the work. It is also an object of my invention to provide an efficient guard for protecting the hands of the operator and the cutting tool during rotation of the lathe spindle, as well as protecting the means employed for driving the work.

And a further object of the invention is to so arrange the driving member as to cause it to recede from the work in the event of any overfeed of a self-feeding tool.

In the accompanying drawings, Figure 1 is a view in perspective showing a portion of a lathe spindle with my improved attachment secured thereto. Fig. 2 is a longitudinal sectional view. Figs. 3 and 4 are views showing, respectively, the head center and the work driving member detached. Figs. 5 and 6 show in detached position the clamp cylinder and the guard ring. Fig. 7 is a modified form of head center.

Referring to the drawings, the head center is shown as having a cylindrical body 1 internally threaded to fit a spindle 2 of a lathe, the center being indicated at 3. Although I have shown this head center as adapted to be screwed upon a lathe spindle, it is manifest that the body 1 may readily be adapted for use with a spindle having a face plate and which is not provided with the usual threaded connection. In such case the body may be solid and have a tapered post 31 for fitting in the opening of the spindle, the center being made to rotate with the face plate by pins 4 projecting from the body and taking in holes drilled in the face plate. Such a modified form of head center is shown in Fig. 7. On the periphery of body 1 and paralleling its axis I provide one or more keys 5 which are adapted to take in slots 6 in a work driver 7. The latter is shown of approximately hollow cylindrical or sleeve-like form with one end partly closed, as at 8, such end being provided with work engaging blades 9 which project laterally therefrom. I have shown but two blades, but it is manifest that four blades may be employed. The work driver is adapted to fit snugly on the head center, the center point of the latter projecting through an aperture 10 countersunk in the end of the work driver. The keyed connection between the center and the work driver prevents independent rotary motion between these parts while at the same time allowing of a longitudinal movement of the work driver on the head center. The contiguous ends of the blades 9 are beveled to adapt themselves to the taper of the center 3 projecting through the opening in the end of the work driver. The head end 12 of the latter has its outer surface tapered and this tapered part is provided with a left hand thread, and is slotted longitudinally as at 13 to permit the tapered end of the cylinder being readily clamped to the body 1 of the head center.

At 14 I have shown a clamping member having a partly tapered bore provided with a left hand thread to screw upon the work driver and securely bind the latter and the head center. The other portion of the bore is cylindrical and has a running fit with the cylindrical portion of the work driver. The head end of the clamping member is shown knurled on the outside and at its tail end is of reduced diameter, as at 15, and provided with a left hand thread to accommodate with a driving fit an interiorly threaded ring-like guard 16, the outer surface of this guard being knurled similar to the head end of the clamping member.

In operation, the center holes are drilled in the work as usual and in one end of the latter one or more diametral slots are cut, the depth and thickness depending entirely upon the character of the work. The device in its assembled position, that is with the work engaging member telescoping the head center and the clamping ring and its complementary guard ring secured on the work engaging member, is screwed home on the lathe spindle by gripping the knurled surface of the clamp. Continued turning of this latter part in the same direction, the threads of which are the reverse of those by which the head center is secured to the spindle, will effect a loosening of the work engaging member on the body of the center, and after the work has been placed between the two centers the blades of the work engaging member may readily be adjusted to the slots in the ends of the work, and while the latter is held with one hand the clamp may be turned with the other until the blade cylinder is firmly bound to the body of the center. The work is then in position to be driven, the blades fitting in the slotted end and the center 3 taking in the drilled hole of the material. If the latter is of a diameter within the extreme ends of the blades, the exposed ends of the blades will be protected by the guard cylinder 12, which, under such conditions, is designed to project out beyond the longitudinal edge of the blades, but if the work is of greater diameter than the length of such blades, the guard may be screwed back upon the clamping cylinder so as not to interfere with the connection between the blades and the work.

It is apparent that by the use of my invention the work may be turned close up to the blades thus effecting a saving in material, and that should the tool, where of the self-feeding type, contact with the edges of the guard ring the latter and the clamping member will be unscrewed from the work driver which becoming loosened will be pushed back, detaching itself from the work. It is also obvious that the work may readily be removed at any time for fitting purposes without inconvenience and entirely free of all supporting parts, the return of the material to the lathe being easily and certainly effected, as well that the attachment and removal of the device from the lathe may be effected in its assembled position and without the use of any tools.

I claim as my invention:

1. An attachment for lathes comprising a head center, a work driving member secured to said center and movable longitudinally thereof, and means for regulating such longitudinal movement between said head and said work driving member.

2. An attachment for lathes comprising a head center, a member secured to said head and movable longitudinally thereof, work driving means at one end of said member, and means at the opposite end thereof for clamping it on said center.

3. An attachment for lathes comprising a head center, a member secured to said head and movable longitudinally thereof, work engaging means at one end of said member, means at the opposite end of said member for clamping it on said center, and a guard carried by said last mentioned means and extending over said work engaging means, said clamping means having a screw threaded engagement with said member adapted to release said work engaging means upon contact of the cutting tool with said guard.

4. An attachment for lathes comprising a head center, a work driving member secured to said head, coöperating means on said head and member to prevent independent rotary movement of said parts, said member being free to move longitudinally of said head, and means for clamping said head and member.

5. An attachment for lathes comprising a head center designed to be secured to a lathe spindle, a work driving member telescoping said head and having work engaging blades at one end, coöperating means on said head and member preventing independent rotary movement of said parts, and means for clamping said member as against longitudinal movement on said head.

6. An attachment for lathes comprising a head center designed to be secured to a lathe spindle, a work driving member telescoping said head and having work engaging blades at one end, coöperating means on said head and member preventing independent rotary movement of said parts, means for clamping said member as against longitudinal movement on said head, and a guard for said blades carried by said clamping means.

7. An attachment for lathes comprising a head center designed to be secured to a lathe spindle, a work driver having a longitudinally slotted tapered portion and telescoping said center head, a key and slot connection between said head and work driver to prevent independent rotary movement of said parts, said tapered portion of the work driver being threaded on its exterior, and a clamping ring for engaging said threaded portion to clamp said work driver to said head.

8. An attachment for lathes comprising a head center adapted to be secured to a lathe spindle, a work driver telescoping said head center and having a longitudinally slotted portion, work engaging means at the tail end of said driver, the head end of the latter being tapered on its exterior, a clamping member for engaging the end of said work driver and a guard ring on said clamping member.

9. An attachment for lathes comprising a head center adapted to be secured to a lathe spindle, a work driver telescoping said head center and having a longitudinally slotted portion, work engaging means at the tail end of said driver, the head end of the latter having a left hand thread on its exterior, a clamping member having a screw threaded bore for engaging the end of said work driver, and a guard ring on said clamping member, the latter and said guard being adapted to automatically release said driver upon the cutting tool contacting therewith in any overfeed of the latter.

10. An attachment for lathes comprising a head center adapted to be secured to a lathe spindle, and having a longitudinal key on its periphery, a work driver having a way to receive said key and a tapered portion, said driver being designed to telescope said head center, work engaging blades extending laterally from one end of said work driver, the latter having an opening adjacent said blades to receive the center point, and the contiguous ends of the blades being beveled to conform to such center, and a clamping sleeve on said work driver.

11. An attachment for lathes comprising a head center adapted to be secured to a lathe spindle, a work driver designed to telescope said head center having work engaging blades at one end and a longitudinally slotted tapered portion, said tapered portion being exteriorly threaded, coöperating means on said head and work driver to prevent independent rotary movement while permitting longitudinal movement of said parts, and an interiorly threaded clamping member adapted to bind the tapered portion of said work driver on said head center.

12. An attachment for lathes comprising a head center adapted to be secured to a lathe spindle, a work driver designed to telescope said head center having work engaging blades at one end and a longitudinally slotted tapered portion, said tapered portion being exteriorly threaded, coöperating means on said head and work driver to prevent independent rotary movement while permitting longitudinal movement of said parts, and a clamping member having a bore tapered in part and cylindrical in part, said tapered part being threaded and adapted to bind the tapered portion of said work driver on said head center.

13. An attachment for lathes comprising a head center adapted to be secured to a lathe spindle, a work driver of hollow cylindrical form designed to be clamped to said head to rotate therewith, said driver being closed at one end and having spaced apart work engaging blades projecting laterally from said closed end, the center of said head being designed to project through the opening in the end of said driver, and to lie within the space between said blades.

In testimony whereof, I have signed this specification.

PETER ARCHER.